United States Patent
Rankin et al.

(10) Patent No.: US 8,914,973 B2
(45) Date of Patent: Dec. 23, 2014

(54) ENGINE CYLINDER SLEEVE HEATER AND METHOD

(75) Inventors: Brent C. Rankin, Lima, OH (US); Michael Bergman, Versailles, OH (US); Phillip Ford, Union City, IN (US)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 13/069,713

(22) Filed: Mar. 23, 2011

(65) Prior Publication Data

US 2011/0168688 A1 Jul. 14, 2011

Related U.S. Application Data

(62) Division of application No. 11/678,873, filed on Feb. 26, 2007, now abandoned.

(51) Int. Cl.
| | |
|---|---|
| *B23P 19/00* | (2006.01) |
| *B23P 21/00* | (2006.01) |
| *B23P 11/00* | (2006.01) |
| *H05B 1/02* | (2006.01) |
| *B23P 11/02* | (2006.01) |
| *B23P 19/04* | (2006.01) |

(52) U.S. Cl.
CPC .............. *B23P 11/025* (2013.01); *B23P 19/043* (2013.01)
USPC .................. 29/800; 29/705; 29/707; 29/709; 29/407.1; 29/407.09; 29/888.06; 29/888.061; 219/494

(58) Field of Classification Search
USPC ........... 29/800, 707, 709, 705, 407.1, 407.09, 29/888.06, 888.061; 219/202, 205, 206, 219/490, 494; 700/95, 117
See application file for complete search history.

(56) References Cited

U.S. PATENT DOCUMENTS

| | | | | |
|---|---|---|---|---|
| 3,822,690 A | * | 7/1974 | Kofink | 126/110 B |
| 3,916,870 A | * | 11/1975 | Beavers | 126/110 B |
| 4,108,143 A | * | 8/1978 | Pelsue et al. | 126/110 B |
| 4,113,813 A | * | 9/1978 | Wilson | 264/296 |
| 4,244,349 A | * | 1/1981 | Velie et al. | 126/110 C |
| 4,406,402 A | * | 9/1983 | Henriques | 237/19 |
| 4,532,914 A | * | 8/1985 | Thomas et al. | 126/110 C |
| 4,729,365 A | * | 3/1988 | Mutchler | 126/110 B |
| 4,788,413 A | * | 11/1988 | Eng | 392/385 |
| 4,921,734 A | | 5/1990 | Thorpe et al. | |
| 5,349,161 A | | 9/1994 | Bockholt | |
| 6,142,141 A | * | 11/2000 | Long | 126/110 B |
| 6,152,128 A | * | 11/2000 | Willey et al. | 126/110 B |
| 6,454,127 B1 | * | 9/2002 | Suomela et al. | 222/54 |
| 6,880,549 B2 | * | 4/2005 | Topp | 126/110 B |
| 7,255,069 B2 | * | 8/2007 | Liebert | 123/41.79 |
| 7,513,237 B1 | * | 4/2009 | Liebert | 123/195 H |

(Continued)

OTHER PUBLICATIONS

Office Action of U.S. Appl. No. 11/678,873 dated Jun. 23, 2011.

*Primary Examiner* — Jermie Cozart
*Assistant Examiner* — Bayan Salone
(74) *Attorney, Agent, or Firm* — Rankin, Hill & Clark LLP

(57) ABSTRACT

A method for installing a heated piston into a cylinder sleeve that is initially smaller than the piston includes: receiving the engine block at a heating station, heating the engine cylinder sleeve with heated air for a predetermined time at a predetermined temperature such that a temperature of the cylinder sleeve is equal to or greater than a temperature of the piston, and inserting the piston into the heated cylinder sleeve.

16 Claims, 5 Drawing Sheets

(56) References Cited

U.S. PATENT DOCUMENTS

| | | | |
|---|---|---|---|
| 2002/0092508 A1* | 7/2002 | Kanekawa et al. | 123/543 |
| 2003/0172543 A1* | 9/2003 | Busa et al. | 34/96 |
| 2004/0033382 A1* | 2/2004 | Kendig | 428/518 |
| 2004/0231630 A1* | 11/2004 | Liebert | 123/193.3 |
| 2004/0265658 A1* | 12/2004 | de Vaal et al. | 429/22 |
| 2005/0056780 A1* | 3/2005 | Miller et al. | 250/288 |
| 2005/0121495 A1* | 6/2005 | Yokoyama | 228/9 |
| 2006/0249116 A1* | 11/2006 | Liebert | 123/193.2 |

\* cited by examiner

ENGINE CYLINDER SLEEVE HEATER AND METHOD

This application is a divisional of U.S. application Ser. No. 11/678,873 filed on Feb. 26, 2007, which is expressly incorporated herein by reference.

BACKGROUND OF THE INVENTION

The assembly of an automobile engine requires the installation of pistons into the engine's cylinder sleeves. Prior to this installation, however, each piston must be fitted with a connecting rod. The connecting rod is connected to the piston through the use of a steel pin, known as a wrist pin. The wrist pin is press fit into mounting holes provided by the piston, and the connecting rod moves freely on the wrist pin. For the wrist pin to be pressed into the piston, it is necessary to heat the piston to a predetermined temperature causing adequate expansion of the mounting holes to allow the wrist pin to fit. The heated pistons are then installed into the engine's cylinder sleeves. In their heated state, the pistons are expanded and therefore will fit more tightly into the cylinder sleeves than when the pistons are cool.

Many engines have steel cylinder sleeves and aluminum pistons. During normal engine operation, the aluminum pistons expand more than the associated steel cylinder sleeve. To allow for the excess expansion by the piston, a predetermined cold temperature clearance between the piston and the engine cylinder sleeve is provided during production to prevent the piston from fitting too tightly for proper operation when the engine becomes hot during normal operation.

A problem arises with engines using a silica impregnated aluminum cylinder sleeve and an aluminum piston. Since both the sleeve and the piston are made of essentially the same material, they both expand essentially the same amount due to the heating from engine operation, eliminating the need for the cold temperature clearance. However, since the normal tolerances or spaces between the piston's outside diameter and the cylinder sleeve's inside diameter are now very close, the parts will no longer fit together when the piston alone is heated to install the wrist pin.

Therefore, there exists a need in the art for a method of installing a piston into a cylinder sleeve, wherein the piston is initially at an elevated temperature relative to the cylinder sleeve and wherein the initial inner diameter of the cylinder sleeve is less than or equal to the outer diameter of the piston.

SUMMARY OF THE INVENTION

The present invention provides a method and apparatus for installing a piston, which is initially relatively heated and expanded, into a cylinder sleeve, where the cylinder sleeve's inner diameter is initially less than or equal to the piston's outer diameter.

More specifically, the present invention provides a method for installing a piston into an engine block cylinder sleeve. The method includes heating the piston, inserting a wrist pin into the heated piston, heating the engine cylinder sleeve with a heating apparatus, and inserting the piston into the engine cylinder sleeve.

In further accordance with the present invention, a method for heating an engine cylinder sleeve includes receiving the engine at a heating station, aligning a heating nozzle of the heating apparatus with the engine block cylinder sleeve, heating an incoming air flow to a predetermined temperature with the heating apparatus, and directing the heated air flow to the engine cylinder sleeve through the heating nozzle.

In further accordance with the present invention, a method for optimizing the engine cylinder sleeve heating process includes maintaining a smaller, but continuous air flow through the heating apparatus between cycles (when no engine block is present) to minimize the time required to reheat the air flow.

BRIEF DESCRIPTION OF THE DRAWINGS

These and further features of the invention will be apparent with reference to the following description and drawings, wherein.

DETAILED DESCRIPTION OF THE INVENTION

The invention will now be described in accordance with its preferred embodiments. The description in accordance with the preferred embodiment is not meant to limit the invention but rather is intended as a graphic example of the invention. For example, the invention is hereafter described using heated air to heat the engine cylinder sleeve. While heated air is preferred, heating can also be accomplished through the use of any heated gas. It should be further noted that while the following description and drawings show an engine block with only one cylinder sleeve, it is considered apparent that the invention is not limited to heating only a single engine block cylinder sleeve at a time, but rather that the preferred embodiment of the present invention will simultaneously or sequentially heat all of the cylinder sleeves provided by the engine.

Figure 1:
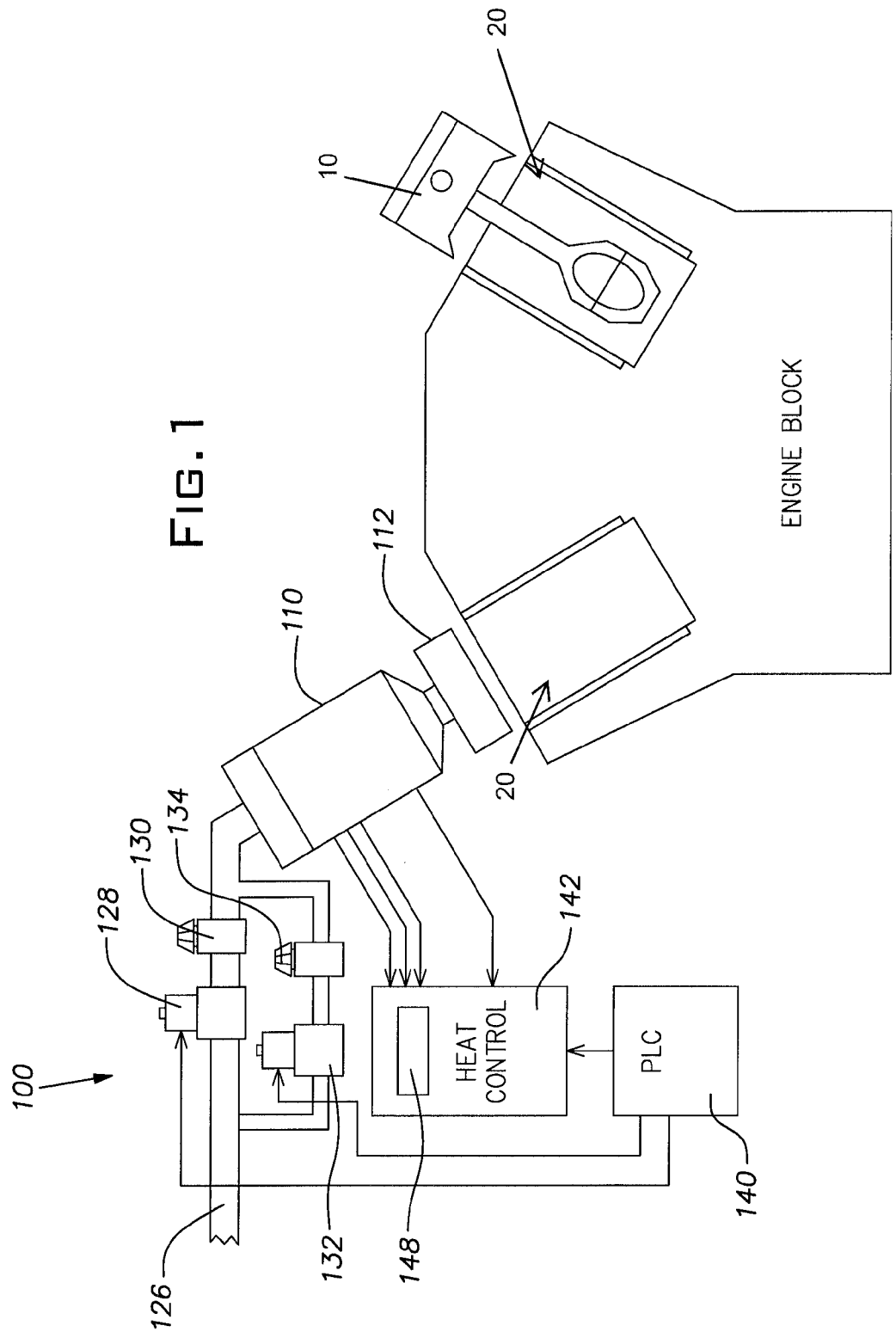
FIG. 1 schematically illustrates a cylinder sleeve heating apparatus according to the present invention.
Figure 2:
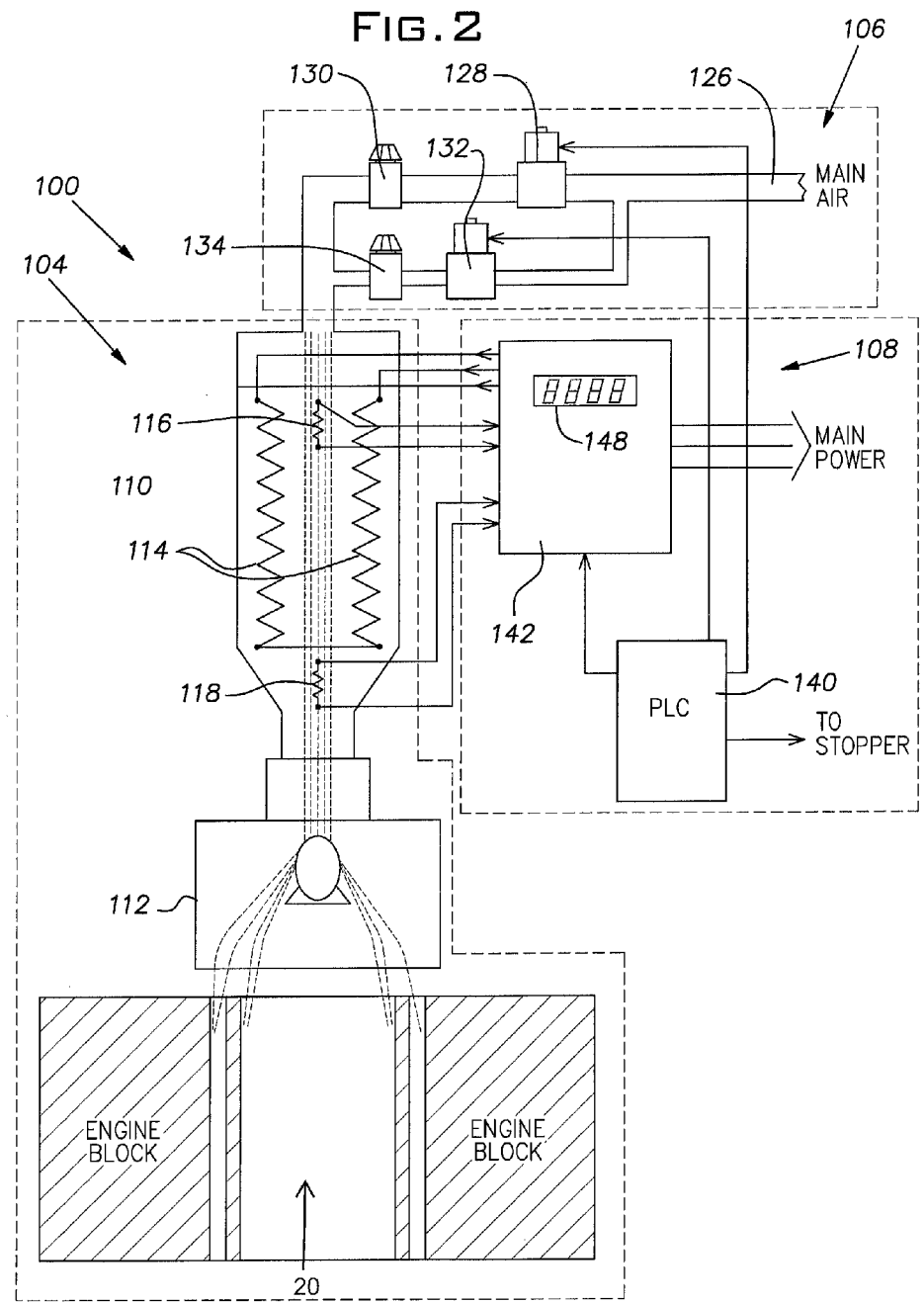
FIG. 2 schematically illustrates a method for heating of the cylinder sleeve within the engine block.

With reference to FIGS. 1 and 2, a heating apparatus 100 according to the present invention includes an air heating and focusing assembly 104, an air intake and regulation assembly 106, and a controller 108.

The air heating and focusing assembly 104 includes a forced air heater 110, an exhaust or heating nozzle 112, electric resistance heating elements 114, an inlet air thermistor 116, and an outlet air thermistor 118. The electric resistance heating elements 114, the inlet air thermistor 116, and the outlet air thermistor 118 are electrically connected to the controller 108.

The air intake and regulation assembly 106 includes a main air supply 126, a main air supply valve 128, an air flow regulator 130, an idle state solenoid valve 132, and an idle state air flow regulator 134. The main air supply valve 128 and idle state solenoid valve 132 are electrically connected to the controller 108. The air intake and regulation assembly 106 is in fluid communication with the air heating and focusing assembly 104.

The controller 108 includes a programmable logic control (PLC) 140 and a heat control unit (HCU) 142. An output control (not shown) is connected to the PLC 140. The HCU 142 further includes a digital display 148 and an input portion (not shown). The PLC 140 and HCU 142 are electrically connected to one another. As will be described hereafter, the PLC 140 primarily controls the flow of air while the HCU 142 primarily controls the heating of the air in response to sensed conditions and signals from the PLC 140 (i.e. operational status of air flow valves, volume of air flow, etc.).

With reference to FIGS. 1 and 2, air from the main air supply 126 enters the air intake and regulation assembly 106 of the heating apparatus 100 and is directed to the main air supply valve 128 and the idle state solenoid valve 132. At any given time, either the main air supply valve 128 or the idle state solenoid valve 132 will be open; however, the main air supply valve 128 and the idle state solenoid valve 132 will never be open simultaneously. When the main air supply valve 128 is open and the idle state solenoid valve 132 is closed, air will flow to the air flow regulator 130. When the idle state solenoid valve 132 is open and the main air supply valve 128 is closed, air will flow to the idle state air flow regulator 134. As will be apparent from the following description, the regulators 130, 134 supply air at a reduced pressure to the air heating and focusing assembly 104.

The air heating and focusing assembly 104 is in fluid communication with the air intake and regulation assembly 106. The regulated air flows into the forced air heater 110 of the air heating and focusing assembly 104. The forced air heater 110 defines an inlet, an outlet, and a length. The inlet air thermistor 116 is disposed at the inlet of the forced air heater 110 while the outlet air thermistor 118 is disposed at the outlet of the forced air heater 110. Electric resistance heating elements 114 extend along the length of the forced air heater 110. Thus, air entering the forced air heater 110 passes over the inlet air thermistor 116 and travels through and past the electric resistance heating elements 114 and then passes over the outlet air thermistor 118. As the air flow passes through the electric resistance heating elements 114, the air is heated. Thereafter, the heated air flows into heating nozzle 112 where it is expelled onto the engine cylinder sleeve 20. The amount of current supplied to the heating elements 114 and, thus, the amount of heat provided by the heating elements 114 is controlled by the HCU 142 in response to temperature signals from the thermistors 116, 118 and air flow signals from the PLC 140 so that the temperature of the air flowing through the heating nozzle 112 tracks a predetermined temperature, as will be apparent from the following discussion.

The heating nozzle 112 is movably secured to the forced air heater 110 and is adapted to engage the engine cylinder sleeve 20. The heating nozzle 112 reshapes the heated air flow to focus the heated air to the cylinder sleeve 20 so as to optimize heat absorption by the cylinder sleeve. It should also be noted that to heat a plurality of cylinder sleeves 20 present in a conventional engine, a like number of heating nozzles 112 will be provided by the heating apparatus 100, or by multiple heating apparatuses.

Figure 3:
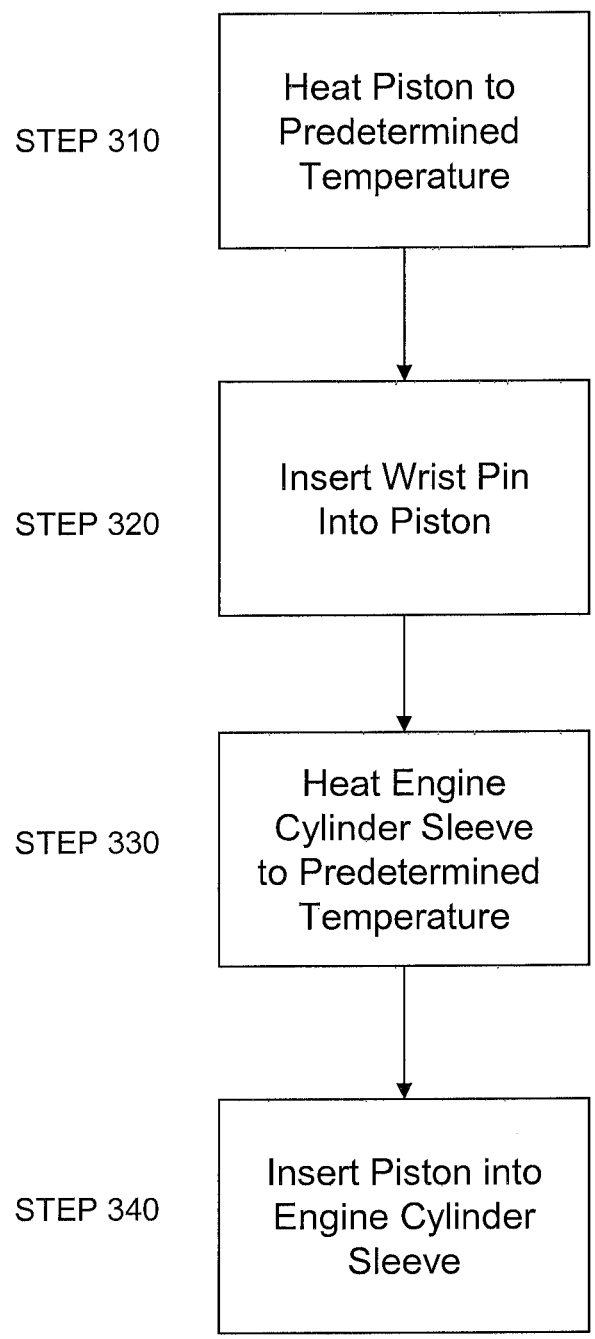
FIG. 3 is a flowchart illustrating the basic steps of the method according to the present invention.

With reference to FIG. 3, a method of installing a piston 10 in an engine cylinder sleeve 20 associated with the heating apparatus 100 will be described. First, the piston 10 is heated (STEP 310) to expand the mounting hole to permit the wrist pin to be inserted therethrough (STEP 320). Then, the engine cylinder sleeve 20 is heated (STEP 330) with heating apparatus 100. Thereafter, the heated piston 10 is slidably inserted into the heated engine cylinder sleeve 20 (STEP 340).

Figure 4:
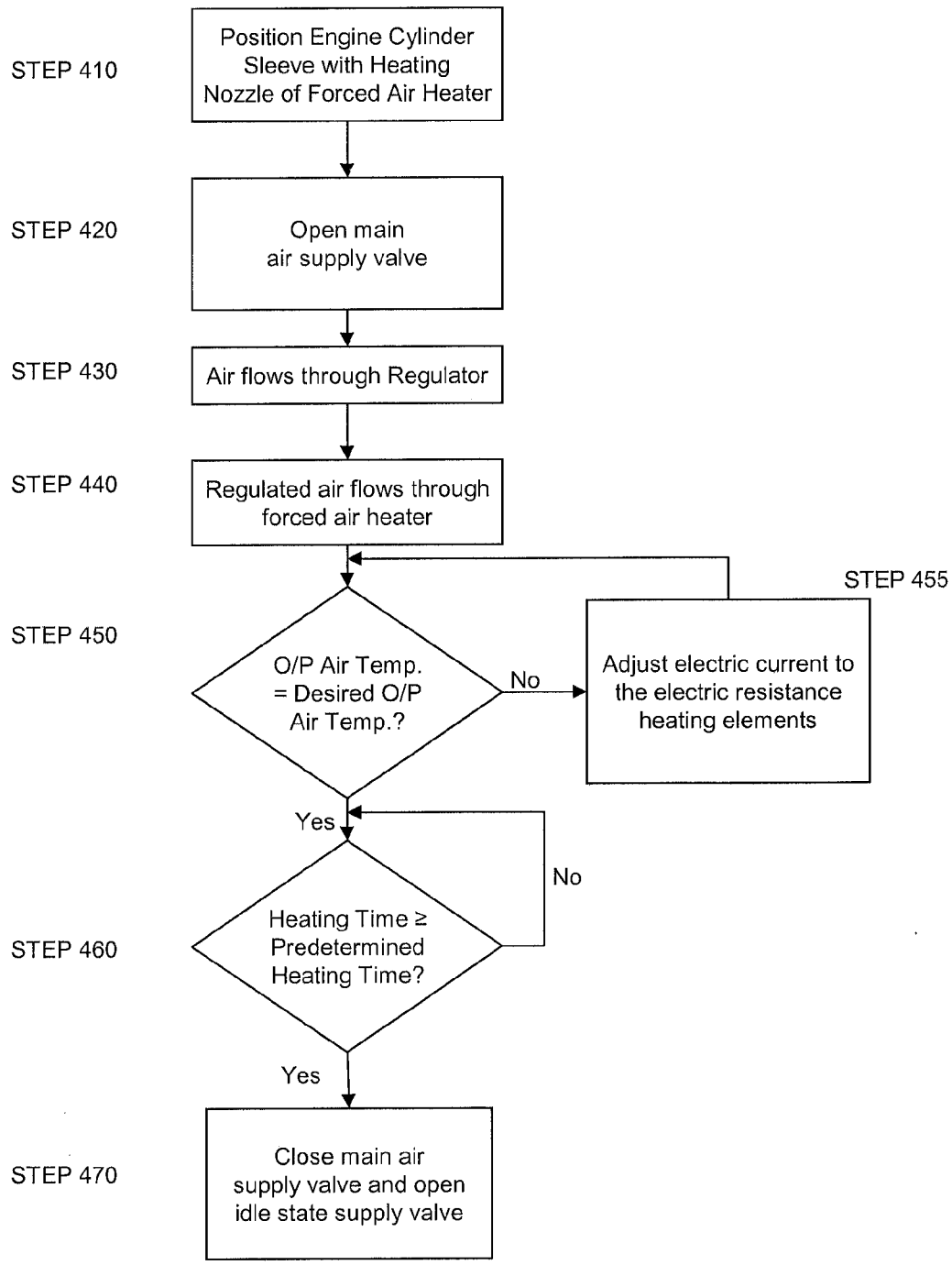
FIG. 4 is a flowchart illustrating the detailed steps of the inventive method.

With reference to FIG. 4, details of the engine cylinder sleeve 20 heating process (i.e., STEP 330) will be described. Preliminarily, the engine block is received at a heating station and positioned adjacent to the heating apparatus 100. Then, the heating nozzle 112 is positioned and aligned with the engine cylinder sleeve 20 (STEP 410). According to the present invention, positioning the heating nozzle 112 can be accomplished in different ways. The heating nozzle 112 can fit over the outer circumference of the cylinder sleeve 20 or slide within the cylinder sleeve 20 and heat the cylinder sleeve 20 from within. Also, the heating nozzle 112 can physically engage the engine block/cylinder sleeve 20 or can be maintained at a distance from the engine block/cylinder sleeve 20.

Once the heating nozzle 112 is properly positioned relative to the cylinder sleeve 20 to be heated, the PLC 140 sends a signal to the main air supply valve 128 (STEP 420), opening the main air supply valve 128 and allowing air to flow through the air flow regulator 130 (STEP 430).

The air flow regulator 130, (STEP 430) regulates the pressure and/or volume of air that is supplied to the air heating and focusing assembly 104 to a predetermined value. Preferably, the air flow regulator 130 is manually preset to supply air at the desired pressure and/or volume. Alternatively, the air flow regulator 130 may be electronically controlled by the controller 140. Further, the regulator 130 may be static (i.e., non-adjustable) so as to be operable in accordance with factory presets. It is believed apparent that the regulator setting will be experimentally determined and may represent a range of desired pressures.

The regulated air (STEP 440) flows through the forced air heater 110 and is heated. The temperature of the air entering the heater 110 is measured by the inlet thermistors 116, while the temperature of the heated air downstream the electrical resistance heating elements 114 is measured by the outlet thermistor 118. The incoming air flow rate as well as the air temperatures measured by the thermistors 116, 118 are fed back to the HCU 142 (STEP 450) and the HCU 142 adjusts the electric current being supplied to the electric resistance heating elements 114 such that the temperature of the air output by the heating system 100 tracks a predetermined air temperature (STEP 455), which has been previously input into the controller 108 by the user.

The heated, pressurized air is output from the heating nozzle 112 and applied to the cylinder sleeve 20 for a predetermined time period (STEP 460). The predetermined heating time period is less than or equal to the cycle time of the assembly line. It is important to note that the predetermined heating time and the predetermined heating temperature are generally inversely proportional to each other in that the longer the cycle time (i.e., cylinder sleeve heating time period), the lower the exhaust air temperature (i.e., predetermined heating temperature) can be to heat the cylinder liner to the predetermined temperature.

After the predetermined heating time period, the cylinder sleeve has been expanded such that the inner diameter of the cylinder sleeve is greater than the outer diameter of piston, the engine is released from the heating station, and the piston 10 may then be inserted into the heated and expanded cylinder sleeve 20 (i.e., STEP 340).

The PLC 140 will signal main air supply valve 128 to close, thereby eliminating the air flow from the main air supply valve 128 to the air flow regulator 130. Simultaneously, the PLC 140 will signal the idle state solenoid valve 132 to open, allowing air to flow to the idle state air flow regulator 134 (STEP 470). When the main air supply valve 128 is closed and the idle state solenoid valve 132 is open, the heating apparatus 100 is in the idle state. The heating apparatus 100 will remain in the idle state until a subsequent heating sequence is initiated.

Figure 5:
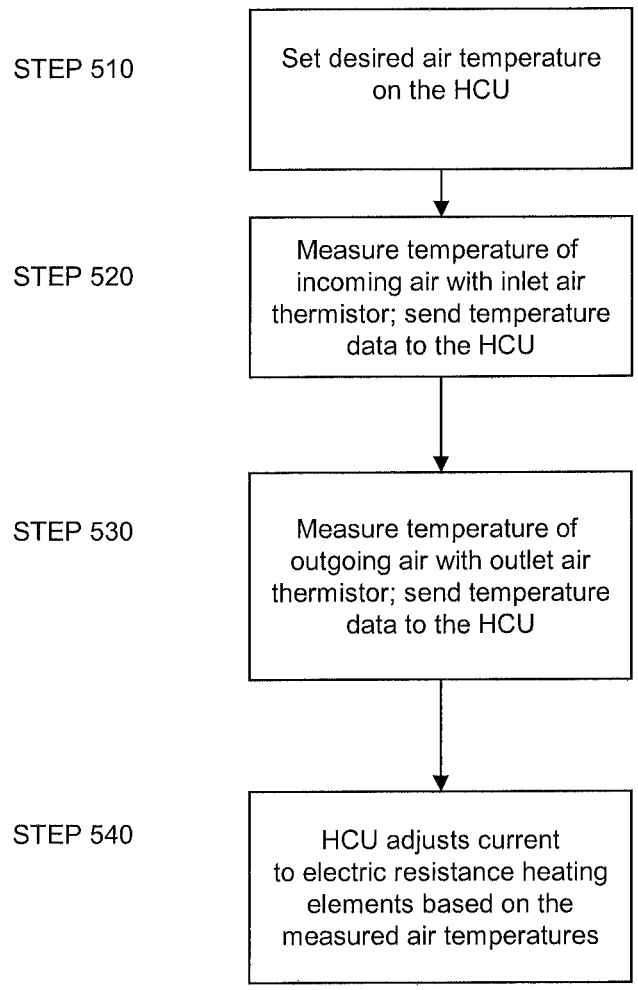
FIG. 5 is a flowchart illustrating a method of setting and monitoring the air temperature according to the present invention.

With reference to FIG. 5, the air heating process will be further described (i.e., STEPS 440-460). Initially, the desired exhaust temperature (i.e., predetermined heating temperature) is preset in the HCU 142 (STEP 510). To determine the appropriate exhaust air temperature, several steps must be followed. First, the piston temperature at the time of piston 10 insertion into cylinder sleeve 20 must be determined. During assembly, the piston 10 is heated to a known, normal range of temperatures and will then cool at a certain, known cooling rate. Therefore, the temperature of the piston 10 can be readily ascertained and can be considered to fall within a range of temperatures. The cylinder sleeve 20 must then be heated to at least the temperature of the piston 10 at the time of piston 10 insertion into the cylinder sleeve 20. The requisite temperature of the cylinder sleeve 20 can be expressed by the equation:

$$T_{CS} = T_P - (t \times CR_P).$$

Where $T_{CS}$ is the required, minimum heated temperature (i.e., predetermined cylinder sleeve temperature) of the cylinder sleeve 20, $T_P$ is the temperature to which the piston 10 is heated, t is the time elapsed since the piston 10 was heated, and $CR_P$ is the cooling rate of the piston 10. $T_{CS}$ is a constant; all operations utilizing the same piston 10 will have the same value for $T_{CS}$. Using the minimum temperature, $T_{CS}$, the exhaust air temperature required to sufficiently heat the cylinder sleeve 20 within the cycle time can be experimentally determined. The experimentation can be influenced by any of the following variables: the air flow volume, the starting temperature of the engine cylinder sleeve 20, the rate of heat transfer to and from the engine cylinder sleeve 20, and the cycle time of the assembly. When the required exhaust temperature is determined, the temperature will be entered into the HCU 142 and will serve as the predetermined exhaust air temperature.

The forced air heater 110 and the HCU 142 work in conjunction with one another to heat the air flow to the desired, predetermined exhaust air temperature. To conserve energy and improve system efficiency, the forced air heater 110 and the HCU 142 attempt to heat the air flow to the predetermined air temperature without overheating the air flow. Monitoring of the air flow temperature is accomplished with the thermistors 116, 118 in communication with the HCU 142.

The temperature of the pressurized air flowing into the forced air heater 110 is measured by the inlet air thermistor 116 and an incoming air temperature signal is provided to the HCU 142 (STEP 520). The output air temperature is measured by the outlet air thermistor 118 and fed back to the HCU 142 (STEP 530). Preferably, the incoming air flow rate is stored in the controller 108 and provided to the HCU 142. In response to the sensed inlet and outlet air temperatures and, optionally, the air flow rate, the HCU 142 adjusts the current sent to the electric resistance heating elements 114 (STEP 540) so that the outlet temperature tracks upon the predetermined exhaust air temperature stored in the HCU 142.

More specifically, if the air temperature at the outlet thermistor 118 is less than the desired or predetermined exhaust air temperature, the HCU 142 will increase the current supplied to the electric resistance heating elements 114. If the air temperature at the outlet air thermistor 118 is greater than the desired or predetermined exhaust air temperature, the HCU 142 will reduce the current supplied to the electric resistance heating elements 114. Naturally, if the temperature at the outlet air thermistor 118 is equal to the desired exhaust air temperature, the HCU 142 will not change the current supplied to the electric resistance heating elements 114.

The amount of current increase or decrease will be based upon a correlation between air flow rate, outlet temperature, and inlet temperature, and preferably is derived from a lookup table stored in the HCU 142. Should incoming air flow rate not be provided to the HCU 142, the amount of current increase or decrease will be based solely on the sensed inlet and outlet temperatures. The method of controlling current supplied to the resistance heating elements 114 in response to sensed air temperatures ensures that the exhaust air temperature coming from the forced air heater 110 is heated to at least the predetermined, desired exhaust air temperature necessary to heat the cylinder sleeves to the predetermined cylinder sleeve temperature within the predetermined time period.

Preferably, the air flow heating process continues during the idle state, in which the idle state solenoid valve 132 is open and the main air supply valve 128 is closed. As such, the outgoing air temperature during the idle state tracks on the predetermined exhaust air temperature, albeit at a lower air flow rate or volume. Maintaining air flow and heating operation during the idle state improves the efficiency and longevity of the heating apparatus 100 by reducing the thermal shock experienced by the heating elements, and reduces the time required to re-establish a flow of heated air during a subsequent heating cycle.

During the idle state, a smaller volume of air flows through the system, reducing energy consumption while preventing the electric resistance heating elements 114 from becoming cold. This smaller air flow enters the air heating and focusing assembly 104 via the idle state solenoid valve 132 and the idle state air flow regulator 134.

The specific volume or rate of the air flow during the idle state can be set manually on the idle state air flow regulator 134, can be set electronically via the PLC 140, or can be a factory-preset by the idle state air flow regulator 134 manufacturer. The specific volume or rate of idle state air flow to which the idle state air flow regulator 134 is set will depend on the system parameters and operator preferences. Specifically, the parameters include the physical characteristics of the electric resistance heating elements 114 and the temperature lag when switching between idle state and normal usage of the heating apparatus 100. Using these parameters, the ideal idle air flow can be experimentally determined.

With reference to FIG. 1, air flowing from the idle state air flow regulator 134 enters the forced air heater 110, flows past the inlet air thermistor 116, the heating elements 114, and the outlet air thermistor 118. As during a cylinder sleeve heating operation, the HCU 142 controls the electric current to the electric resistance heating elements 114 to heat the air to the predetermined temperature.

The operating efficiency achieved by operating in the idle state results from the reduced time required for the electric resistance heating elements 114 to reheat to normal operating temperatures to handle the increased incoming air flow during a subsequent heating operation. As the idle state operation will maintain current supplied to the electric resistance heating elements 114 from the HCU 142, the electric resistance heating elements will be maintained at an elevated temperature. This reduces the required change in temperature for the heating elements 114 and thereby allows for faster heating of the electric resistance heating elements 114 upon initiation of a subsequent heating operation.

The longevity achieved by operating in the idle state results from the reduction or elimination of the thermal shock experienced by the electric resistance heating elements 114. Therefore, by maintaining the idle temperature of the electric resistance heating elements 114 at a higher temperature (i.e., close to normal heating operating temperatures), the thermal shock is reduced.

While the present invention has been described with particularity herein, it is considered apparent that the present invention is capable of numerous modifications, substitutions, and rearrangements of parts without departing from the scope and spirit of the present invention. For example, while the idle state operation is preferred, it is not essential to the operation of the heating apparatus 100 and can be eliminated, if desired. Therefore, the invention is not to be limited to the particular preferred embodiments described hereinbefore, but rather only defined by the claims appended hereto.

What is claimed is:

1. A system for assembling a piston into an engine cylinder sleeve on an engine block being manufactured, comprising:
a piston heated to a predetermined heated piston temperature before assembly into the engine cylinder sleeve;
an engine cylinder sleeve adapted to receive the piston; and
a heating apparatus for heating the engine cylinder sleeve to a predetermined cylinder sleeve temperature before assembling the piston into the engine cylinder sleeve, wherein the predetermined cylinder sleeve temperature is equal to or greater than the predetermined heated piston temperature, the heating apparatus being independent from the engine block being manufactured, wherein the heating apparatus comprises:
an air intake and regulation assembly, the air intake and regulation assembly comprising a main air supply in fluid communication with a main air valve and a main air regulator downstream of the main air valve, wherein the main air supply receives an airflow and directs the airflow to the main air valve which is selectively opened to transmit the airflow to the main air regulator, the main air regulator regulating the airflow;
a heating and focusing assembly downstream of the main air regulator, which receives a regulated flow of air from the air intake and regulation assembly, the heating and focusing assembly comprising a forced air heater and a heating nozzle, the forced air heater comprising an electric resistance heating element and an air temperature sensor and the heating nozzle configured to releasably engage the engine cylinder sleeve and to direct a flow of heated air to the engine cylinder sleeve; and
a controller comprising a heating control unit and a programmable logic controller, wherein the heating control unit is electrically connected to the temperature sensor and the electric resistance heating element, and the programmable logic controller is electrically connected to the main air supply valve, wherein the programmable logic controller selectively opens and closes the main air supply valve and said heating control unit supplies current to the electric resistance heating element such that the electric resistance heating element heats the regulated flow of air from the air intake and regulation assembly such that a temperature of air flow through the heating nozzle is equal to a predetermined exhaust air temperature.

2. The system of claim 1, wherein the air intake and regulation assembly further comprises an idle state intake and regulation assembly, the idle state intake and regulation assembly comprising an idle state air valve that is selectively opened by the controller so as to communicate incoming air to an idle state regulator, wherein the idle state air valve and the idle state regulator are adapted to direct an airflow of a volume less than the airflow associated with the main air supply valve and the main air regulator, and the idle state air valve is electrically connected to the programmable logic controller, the programmable logic controller selectively opening the idle state air valve such that the idle state air valve is only open when the main air valve is closed, and the idle state air valve is closed when the main air valve is open.

3. The system of claim 1, wherein the heating nozzle is configured to releasably engage the engine cylinder sleeve by being slidably inserted within the engine cylinder sleeve.

4. The system of claim 1, wherein the heating nozzle is configured to releasably engage the engine cylinder sleeve by forming a seal over an opening of the engine cylinder sleeve.

5. A system for assembling a piston into an engine cylinder sleeve on an engine block being manufactured, comprising:
a piston heated to a predetermined heated piston temperature before assembly into the engine cylinder sleeve;
an engine cylinder sleeve adapted to receive the piston; and
a heating apparatus for heating the engine cylinder sleeve to a predetermined cylinder sleeve temperature before assembling the piston into the engine cylinder sleeve, wherein the predetermined cylinder sleeve temperature is equal to or greater than the predetermined heated piston temperature, the heating apparatus being independent from the engine block being manufactured, and the heating apparatus comprising:
a regulator assembly for receiving an incoming airflow and regulating the airflow;
a heating device for receiving regulated airflow from the regulator assembly and heating the regulated airflow to a predetermined exhaust air temperature;
a controller operatively connected to the heating device, the controller configured to operate the heating device to heat the regulated airflow for a predetermined period of time based upon a time required to heat the engine cylinder sleeve to the predetermined cylinder sleeve temperature;
an inlet measuring device for measuring an inlet air temperature of the regulated airflow received by the heating device, the inlet measuring device operatively connected to the controller, and the controller configured to operate the heating device based on the inlet air temperature of the regulated airflow as measured by the inlet measuring device;
an outlet measuring device for measuring an outlet air temperature of the heated airflow exhausted from the heating device, the outlet measuring device operatively connected to the controller, and the controller additionally configured to operate the heating device based on the outlet air temperature of the heated airflow as measured by the outlet measuring device; and
a heating nozzle for receiving heated airflow from the heating device and directing the heated airflow to the engine cylinder sleeve, the heating nozzle configured to releasably engage the engine cylinder sleeve and to direct the heated airflow to the engine cylinder sleeve when engaged therewith.

6. The system of claim 5 wherein the regulator assembly receives the incoming airflow from an associated pressurized airflow source, regulates the incoming airflow received from the associated pressurized airflow source and delivers the regulated airflow to the heating device.

7. The system of claim 6 wherein the regulator assembly comprises:
a main air supply valve fluidly connected to the associated pressurized airflow source;
a main flow regulator for regulating airflow passed through the main air supply valve;
an idle state valve fluidly connected to the associated pressurized airflow source; and
an idle state flow regulator for regulating airflow passed through the idle state valve.

8. The system of claim 7 wherein the idle state flow regulator allows a restricted flow of air therethrough relative to the main flow regulator.

9. The system of claim 5 wherein the heating nozzle is configured to reshape the heated airflow to deliver the heated airflow to the engine cylinder sleeve.

10. The system of claim 5 wherein the heating nozzle is configured to releasably engage the engine cylinder sleeve by forming a seal over an opening of the engine cylinder sleeve during heating thereof.

11. The system of claim 5 wherein the heating nozzle is configured to releasably engage the engine cylinder sleeve by one of: fitting over an outer circumference of the engine cylinder sleeve; and sliding within the engine cylinder sleeve and heating the engine cylinder sleeve from within.

12. The system of claim 5 wherein the controller is operatively connected to the regulator assembly, the controller configured to operate the regulator assembly in an idle state after operating the heating device to heat the regulated airflow for the predetermined period of time, wherein in the idle state the regulator assembly is controlled to regulate the incoming airflow to supply the regulated airflow to the heating device at a reduced rate relative to a rate at which the regulated airflow is provided to the heating device while heating the engine cylinder sleeve during the predetermined period of time.

13. The system of claim 5 wherein the inlet measuring device is an inlet air thermistor and the outlet measuring device is an outlet air thermistor.

14. The system of claim 5, wherein the heating device is an electric resistance heating element.

15. The system of claim 14, wherein the controller is configured to supply a current to the electric resistance heating element;

wherein the controller is configured to compare the outlet air temperature measured by the outlet measuring device to the predetermined exhaust air temperature and to adjust the current supplied to the electric resistance heating element based on a difference between the outlet air temperature measured by the outlet measuring device and the predetermined exhaust air temperature, wherein the controller is configured to decrease the current supplied to the electric resistance heating element when the outlet air temperature measured by the outlet measuring device is greater than the predetermined exhaust air temperature, and to increase the current supplied to the electric resistance heating element when the outlet air temperature measured by the outlet measuring device is less than the predetermined exhaust air temperature, wherein a decrease in the current supplied to the electric resistance heating element decreases heating of the regulated airflow by the electric resistance heating element, and an increase in the current supplied to the electric resistance heating element increases heating of the regulated airflow by the electric resistance heating element.

16. The system of claim 15, wherein the controller is configured to adjust the current supplied to the electric resistance heating element based on the inlet air temperature measured by the inlet measuring device.

* * * * *